United States Patent
Shaffer et al.

(10) Patent No.: US 8,971,511 B2
(45) Date of Patent: Mar. 3, 2015

(54) METHOD AND APPARATUS FOR ENHANCING SPEAKER SELECTION

(75) Inventors: Shmuel Shaffer, Palo Alto, CA (US);
Shantanu Sarkar, San Jose, CA (US);
Labhesh Patel, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 1939 days.

(21) Appl. No.: 11/278,371

(22) Filed: Mar. 31, 2006

(65) Prior Publication Data
US 2007/0263821 A1    Nov. 15, 2007

(51) Int. Cl.
*H04M 3/42* (2006.01)
*H04M 3/56* (2006.01)

(52) U.S. Cl.
CPC ............ *H04M 3/56* (2013.01); *H04M 3/42187* (2013.01); *H04M 3/566* (2013.01); *H04M 2203/5072* (2013.01); *H04M 2242/06* (2013.01)
USPC .................................................. 379/202.01

(58) Field of Classification Search
CPC .............. H04M 3/56; H04M 2250/62; H04M 2203/5054; H04M 2203/5009; H04M 2203/5207; H04M 2203/5081; H04M 2215/2093; H04M 2207/203; H04L 12/1822
USPC ..................... 379/202.01, 158; 370/260, 267; 375/299; 348/14, 15, 16; 455/416
See application file for complete search history.

(56) References Cited

U.S. PATENT DOCUMENTS

| | | | |
|---|---|---|---|
| 5,440,624 A * | 8/1995 | Schoof, II | 379/202.01 |
| 5,491,798 A * | 2/1996 | Bonsall et al. | 709/204 |
| 5,859,663 A * | 1/1999 | Simon | 348/14.07 |
| 5,907,324 A * | 5/1999 | Larson et al. | 715/753 |
| 6,628,767 B1 * | 9/2003 | Wellner et al. | 379/202.01 |
| 6,839,417 B2 * | 1/2005 | Weisman et al. | 379/204.01 |
| 7,313,593 B1 * | 12/2007 | Pulito et al. | 709/204 |
| 7,330,541 B1 * | 2/2008 | Surazski et al. | 379/202.01 |
| 7,492,888 B2 * | 2/2009 | Power et al. | 379/265.13 |
| 7,505,574 B2 * | 3/2009 | O'Brien et al. | 379/202.01 |
| 2003/0198193 A1 * | 10/2003 | Li | 370/260 |
| 2003/0223562 A1 * | 12/2003 | Cui et al. | 379/202.01 |
| 2004/0052218 A1 * | 3/2004 | Knappe | 370/260 |
| 2005/0032539 A1 * | 2/2005 | Noel et al. | 455/518 |
| 2007/0189487 A1 * | 8/2007 | Sharland et al. | 379/202.01 |

* cited by examiner

*Primary Examiner* — Oleg Asanbayev

(57) ABSTRACT

A method and apparatus to provide speaker selection in a multi-party conference call is described. The method may comprise processing a speaker queue for at least one new speaker and monitoring when a number of active speakers is less than a predetermined number of active speakers. When less than the predetermined number, the method automatically, without human intervention, adds a new speaker from the speaker queue. A request for a new speaker may be received via a communication channel independent of a voice communication channel of the multi-party conference call. The request may be received from the conference endpoint via a voice communication channel of the multi-party conference call. In an example embodiment, new speakers in the speaker queue may be prioritized based a class of service associated with each new speaker. Priority may be given to a new speaker with a higher associated class of service.

7 Claims, 7 Drawing Sheets

METHOD AND APPARATUS FOR ENHANCING SPEAKER SELECTION

FIELD

This application relates to a method and apparatus to enhance speaker selection during a multi-party conference.

BACKGROUND

In current voice conferencing systems, a speaker selection algorithm in a conferencing bridge detects active speakers and creates an output stream by mixing the audio for the active speakers or active participants. The active stream is then communicated to the participants on the conference call. However, selection of the active speakers involves selecting the most active three or four speakers based on energy levels of voice communications received from the telephony endpoints where the active speakers are located. All other speakers are excluded from the speaker selection algorithm when speech from the three or four active speakers is received.

Only allowing speech from three or four speakers, and excluding all other participants when the three or four speakers are active, may usually work well since three or four speakers is the maximum intelligible number of speakers in a mix; more than this typically results in noise or unintelligible speech on the conference bridge. Thus, conventional speaker selection algorithms by design end up not allowing new speakers to join until one of the existing speakers has been quiet for a while. Although this eliminates interruptions it also precludes new speakers from the opportunity to speak if the active speakers continue to keep speaking. Only when an active speaker is once again quiet does the speaker selection algorithm free up a slot for a new speaker, and the next person to speak will get the freed slot. The next person to speak is not necessarily the person who has been waiting the longest to speak. A person who might have been trying for some time to speak may thus not be provided an opportunity to speak.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of embodiments of the present invention. It will be evident, however, to one skilled in the art that the present invention may be practiced without these specific details.

Figure 1:
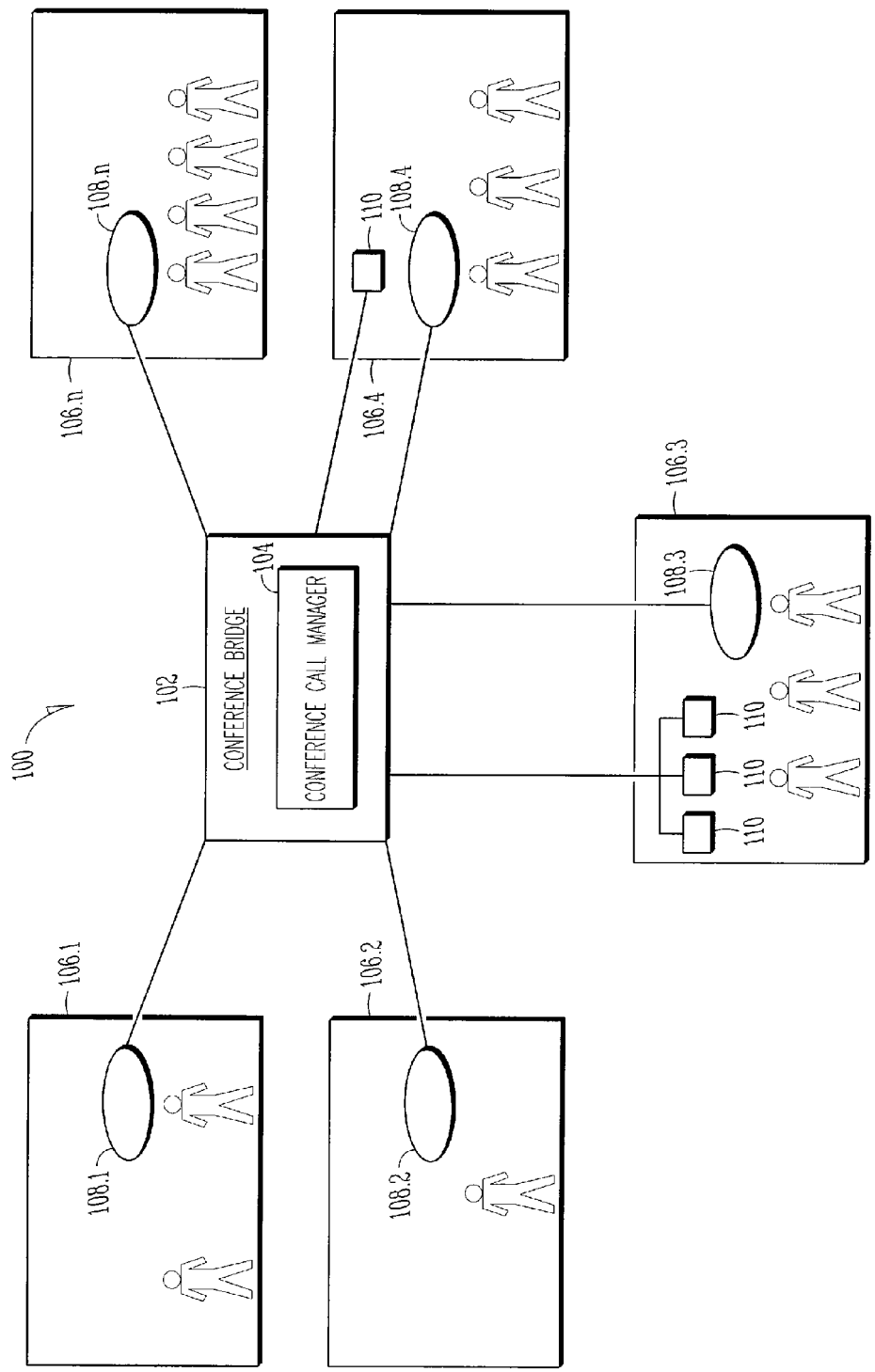
FIG. 1 shows a system, in accordance with an example embodiment, to provide speaker selection in a multi-party conference call.

Referring to FIG. 1, reference 100 generally indicates a system, in accordance with an example embodiment, to provide speaker selection in a multi-party conference call. For example, the system 100 may allow a participant in a conference call automatically without human intervention to break into the conversation, even though a maximum number of speakers (or active speaker slots) that a conference call speaker algorithm allows to speak at any given time (an active speaker group) has been reached. In addition or instead, the system 100 allows new speakers (a person trying to speak or waiting to speak in a conference call) to be added to a speaker queue where new speakers in the speaker queue are selectively added as active speakers.

The system 100 is shown to include a conference bridge 102 that has a conference call manager 104, in accordance with an example embodiment. The conference call manager 104 manages calls from a plurality of conference locations 106.1-106.n which may be geographically separated. At each conference location 106.1-106.n, a telephony endpoint 108.1-108.n is provided. The telephony endpoints 108.1-108.n allow multiple speakers at the conference locations 106.1-106.n to participate in a multi-party conference call. Although example embodiments are described with reference to telephony endpoints, it should be understood that the term "telephony endpoint" is intended to include any multi-media enabled endpoint capable to participate in multi-media multi-party conference. In addition to the telephony endpoints 108.1-108.n, the conference locations 106.1-106.n may also include conference call participants with computers 110 (e.g. desktop computers, laptop computers, or any other networked device such as smart phones, or the like). In an example embodiment, as described in more detail below, any one or more of the participants may communicate a request to the conference call manager 104 via the conference call voice channel, or via another network using, for example, the computers 110. In response to such a request, the conference call manager 104 may queue one or more new speakers as described in more detail below. It will also be appreciated that one or more of the telephony endpoints 106.1-106.n may be telephony enabled computers.

Figure 2:
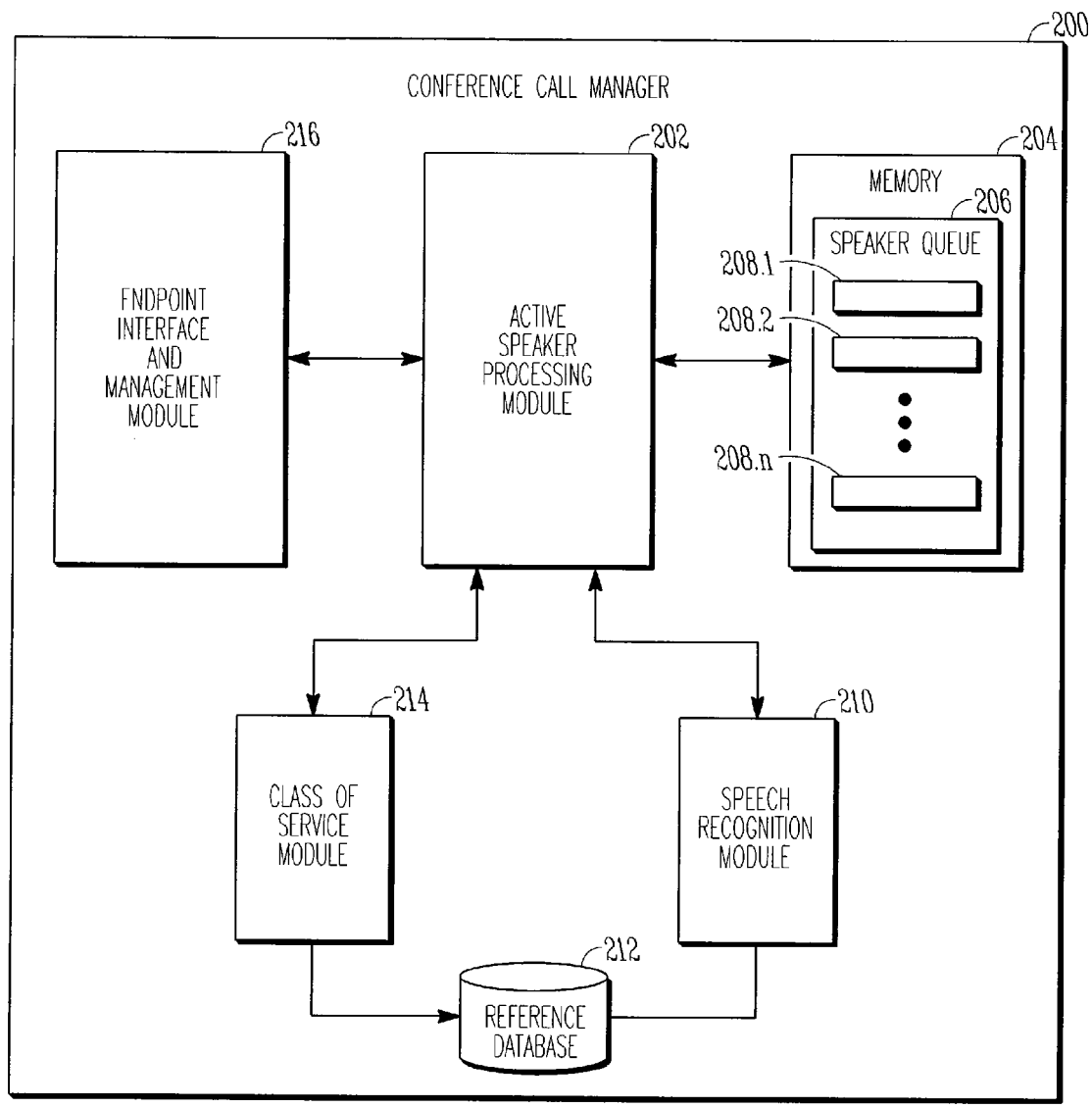
FIG. 2 shows a conference call manager, in accordance with an example embodiment, of the system of FIG. 1.

Referring to FIG. 2, reference 200 generally indicates example detail of a conference call manager, for example, the conference call manager 104 of the system 100 shown in FIG. 1. The conference call manager 200 is shown to include an active speaker processing module 202, and memory 204 which stores a speaker queue 206 that provides a plurality of speaker slots 208.1-208.m for new speakers. The conference call manager 200 in an example embodiment also includes an optional speech recognition module 210 which interacts with a reference database 212. Further, the conference call manager 200 may optionally include a class of service module 214 which may also interact with the reference database 212 to provide different speakers with a difference class of service in a multi-party conference call.

In order to communicate with the telephone endpoints 108.1-108.n, the conference call manager 200 includes an endpoint interface and management module 216. The endpoint interface and management module 216 may interface and manage voice only and/or video conferencing endpoints.

In an example embodiment, the conference call manager 200 may enhance speaker selection in a conference call environment where the conference call system only allows a predetermined number of active speakers at any given time. For example, a speaker selection algorithm may be provided that only permits a limited number of active speakers (e.g. three speakers) at any given time during a multi-party conference call. For example, the active speaker processing module 202 may include a speaker selection algorithm that allows a predetermined maximum number of speakers based on any energy levels received from a particular telephony endpoint 108.1-108.$n$. This algorithm typically does not allow a new speaker to become an active speaker when the energy levels of the predetermined number of active speakers remain above a certain level. Accordingly, once the predetermined number of speakers are active and continue to speak, new speakers are precluded or prevented from participating in the conference call. However, including the methodology described herein, new speakers may be selectively added.

Figure 3:
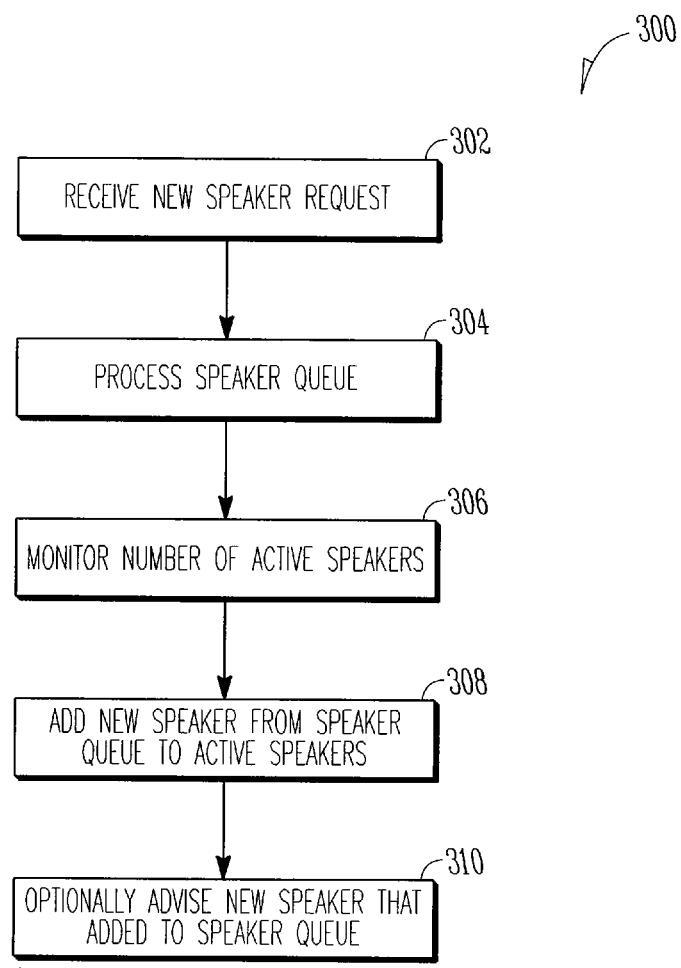
FIG. 3 shows a method, in accordance with an example embodiment, of providing speaker selection in a multi-party conference call.

Referring to FIG. 3, reference 300 generally indicates a method, in accordance with an example embodiment, of providing speaker selection in a multi-party conference call. As shown at block 302, a request may be received by a conference bridge (e.g. the conference bridge 102) for a new speaker request. For example, the conference call manager 200 may receive an Instant Message (IM), email, web communication, or the like from a participant in a conference call using the computers 110. The request may identify that the speaker wishes to say something in the conference call. In an embodiment, instead of communicating a request via a separate network such as the Internet using an IM, email, or web communication, a new speaker may also speak into a telephony endpoint 108.1-108.$n$ and the active speaker processing module 202 may then queue the speaker in the speaker queue 206 (see FIG. 2). For example, assuming there are no other speakers in the speaker queue 206, the new speaker would then be queued in new speaker slot 208.1 of the speaker queue 206. Should another new speaker then request an opportunity to speak, the subsequent new speaker would then be queued in new speaker slot 208.2. In this manner, multiple speakers may be queued in the speaker queue 206. Thus, the method 300, as shown at block 304, may process a speaker queue (e.g. the speaker queue 206) and add new speakers to the speaker queue.

Thereafter, as shown at block 306, the method 300 may monitor the number of active speakers in the conference call and, when the number of active speakers drops below the predetermined maximum number of active speakers, the method 300 then adds a new speaker from the speaker queue 206 to the active speakers (see block 308). For example, the method 300 may add the new speaker currently in a new speaker slot 208.1 to the current active speakers in the conference call. The new speaker in new speaker slot 208.1 is then removed from the speaker queue 206 and all other new speakers in the speaker queue 206 are moved up one slot. For example, the new speaker in new speaker slot 208.2 is then moved into new speaker slot 208.1 so that, when an active speaker slot becomes available again, the new speaker in speaker slot 208.1 is injected automatically into the active speaker group.

In an example embodiment, when a new speaker is added to the speaker queue 206, the method 300 optionally advises the new speaker that he or she has been added to the speaker queue 206 (see block 310). Further, the new speaker may be advised at what position within the speaker queue 206 the person has been inserted. It will be appreciated that different modalities may be used to advise the new speaker that he or she has been added to the speaker queue 206. For example, the conference call manager 200 may send an indication to a telephony endpoint 108-108.$n$ associated with the new speaker which may provide a blinking light or the like to indicate to the participants at the associated conference call location 106.1-106.$n$ that a speaker at the location has been added to the speaker queue 206. In an example embodiment, an audio communication within the voice channel may be sent to the user at a reduced volume level that is lower than a volume level of voice communications of the conference call to inform the speaker that he or she has been added to the speaker queue 206. Thus, an indication may be "whispered" to a conference call participant. In addition or instead, the conference call manager 200 may send an email, IM, web communication, or the like to a participant.

Thus, in an example embodiment, even though a conference call algorithm only permits a predetermined or limited number of active speakers at any given time during a conference call, the method 300 allows new speakers to be queued so that when an active speaker stops speaking, a new speaker from the speaker queue may then be added as an active speaker. In an example embodiment, the method 300 provides a conference call moderator with an option to eject a current active speaker and immediately insert a new speaker from the speaker queue 206 into the active speaker group. Further, the conference call manager 200 may provide a graphical user interface displaying details of the speaker queue 206.

Figure 4:
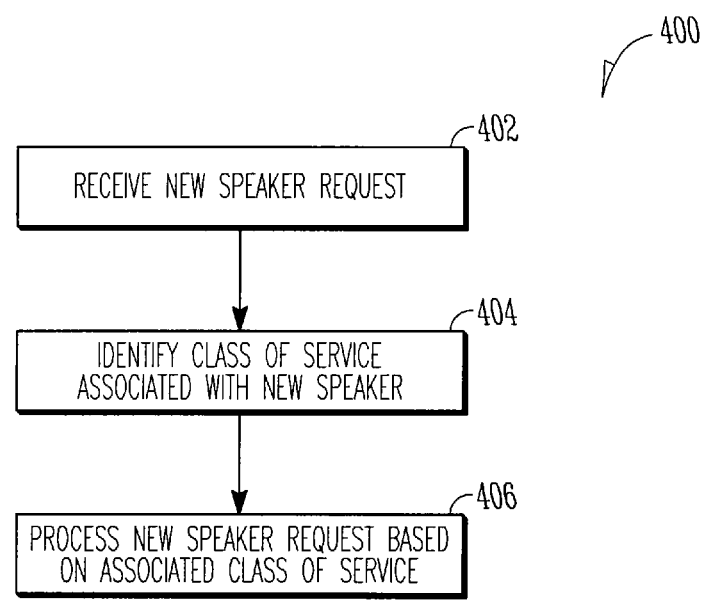
FIG. 4 shows a method, in accordance with an example embodiment, of processing a new speaker in a multi-party conference call based on a class of service.

Referring to FIG. 4, reference 400 generally indicates a method, in accordance with an example embodiment, of providing speaker selection based on a class of service associated with a new speaker. As shown at block 402, the method 400 may receive a new speaker request (e.g. a speaker request via voice, IM, email, web communication or in any other manner) and identify the speaker (or conference location 106.1-106.$n$) making the new speaker request. For example, when an IM communication, email communication, spoken communication, or web communication is received from a particular conference call participant, the method 400 may then identify from that communication the name of the participant and, as shown at block 404, identify a class of service associated with the new speaker. For example, as shown in FIG. 2, the conference call manager 200 may utilize its class of service module 214 and interrogate the database 212, which may define a class of services associated with each speaker. For example, the reference database 212 may be a corporate database and each member of a corporation may then be provided with a particular class of service. For example, a CEO may be provided with a higher class of service than a director of a particular division within the corporation. As shown at block 406, the method 400 may then process a new speaker request based on an associated class of service that is identified, for example, in the reference database 202.

It will be appreciated that based on the particular class of service, an existing active speaker may be automatically ejected and the new speaker may be immediately inserted into the active speaker group automatically without human intervention. In addition, or instead, the new speaker may be automatically added to the speaker queue 206. The particular new speaker slot 208.1-208.$m$ into which the new speaker is added in the speaker queue 206 may be dependent upon the class of service associated with the new speaker. For example, following on the CEO example given above, when the CEO makes a request to be a new speaker or attempts to speak during a conference call, the CEO may be automatically inserted into new speaker slot 208.1 or be automatically inserted into the active speaker group after ejecting a current active speaker with a lower class of service.

Thus, the methodology and system described herein may allow a new speaker to be automatically, without human intervention, injected into the active speaker group or be added to a new speaker queue based on a class of service associated with a new speaker even though the speaker algorithm may select active speakers based on energy levels received from telephony endpoints.

Figure 5:
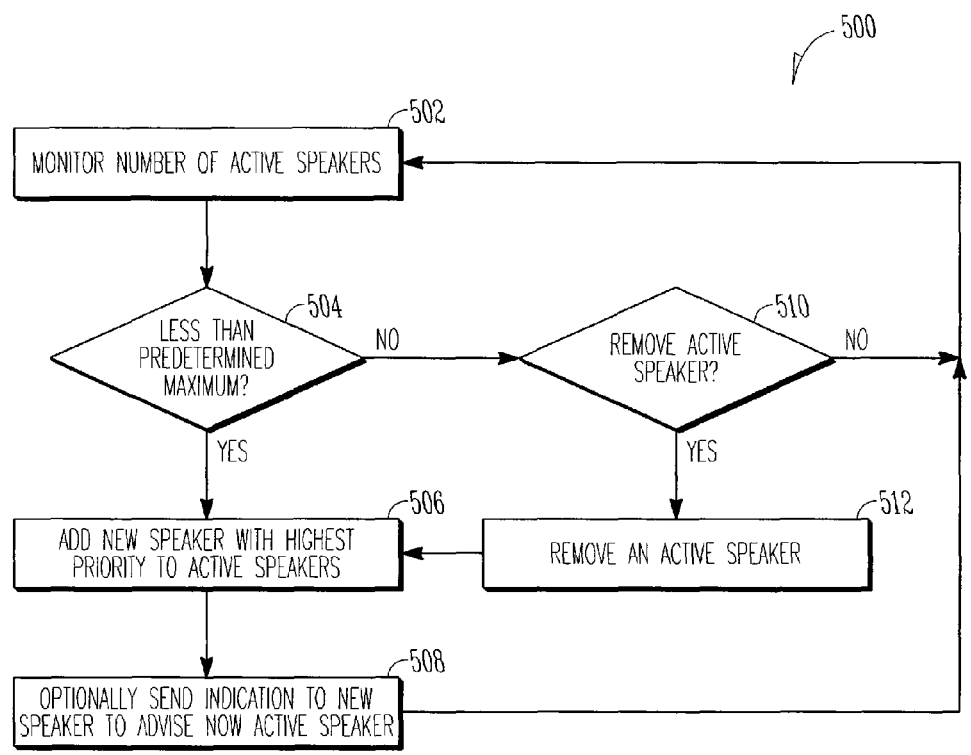
FIG. 5 shows a method, in accordance with an example embodiment, of adding a new speaker to a conference call based on a priority associated with the new speaker.

Referring to FIG. 5, reference 500 generally indicates a method, in accordance with an example embodiment, of adding new speakers in a multi-party conference call. In an example embodiment, the method 500 is used to manage active speakers where a conference call speaker algorithm only allows a predetermined number of active speakers at any given time. As shown at block 502, the method 500 may monitor the number of active speakers and, when the number of active speakers is less than a predetermined number (see block 504), a predetermined action may be performed. For example, if the number of active speakers is less than the predetermined maximum, then as shown at block 506, a new speaker may be added from a speaker queue (e.g., the speaker queue 206). For example, new speakers in the speaker queue may have a particular priority (e.g., based on a class of service) and a speaker with a higher priority may be added as an active speaker before a speaker with a lower priority is added. Thereafter, as shown at block 508, the method 500 may optionally send an indication to a new speaker to advise that the new speaker is now an active speaker. This communication may, for example, be via an IM, email, web communication, an indicator (e.g. a blinking light on a telephony endpoint 108.1-108.n) or the like. In an example embodiment, an audio communication within the voice channel may be sent to the new speaker at a reduced volume level that is lower than a volume level of voice communications of the conference call to inform the new speaker that he or she may now speak. Thus, an indication may be "whispered" to a conference call participant.

In an example embodiment, the new speaker added to the active speaker group may be provided with a time window during which to commence speaking. For example, an indicator may be sent to the new speaker indicating he or she has been added to the active speaker and, if the new speaker does not commence speaking with a few seconds (e.g., two or three seconds) the new speaker may be removed as an active speaker.

In an example embodiment, conference call manager 200 may send an IM (or any other communication) to all of the conference call participants 108.1-108.n that are logged into their IM system (or any other electronic communication network) advising them that the next few seconds (e.g., 1-2 seconds) have been allocated to another user and they should not attempt to talk as their media would not be mixed. Further, participants may be advised that active speaking slots have been pre-assigned for the few seconds to certain speakers.

Returning to decision block 504, if the number of active speakers is not less than the predetermined maximum and all active speaker slots are in use, then in an optional embodiment, as shown at decision block 510, a determination is made whether or not an active speaker should be removed from the current group of active speakers. For example, when a high priority is associated with a particular speaker (e.g. a high class of service as described with reference to FIG. 4), an existing active speaker with a lowest class of service or priority may be removed from the active speaker group. A speaker in the speaker queue (e.g. the speaker queue 206) may be added as an active speaker (see block 512). If, however, an active speaker is not to be removed from the active speaker group, the method 500 returns to block 502. In an example embodiment, a moderator may be provided with the facility to automatically remove active speakers from the active speaker group and/or automatically insert a new speaker from the new speaker queue.

Figure 6:
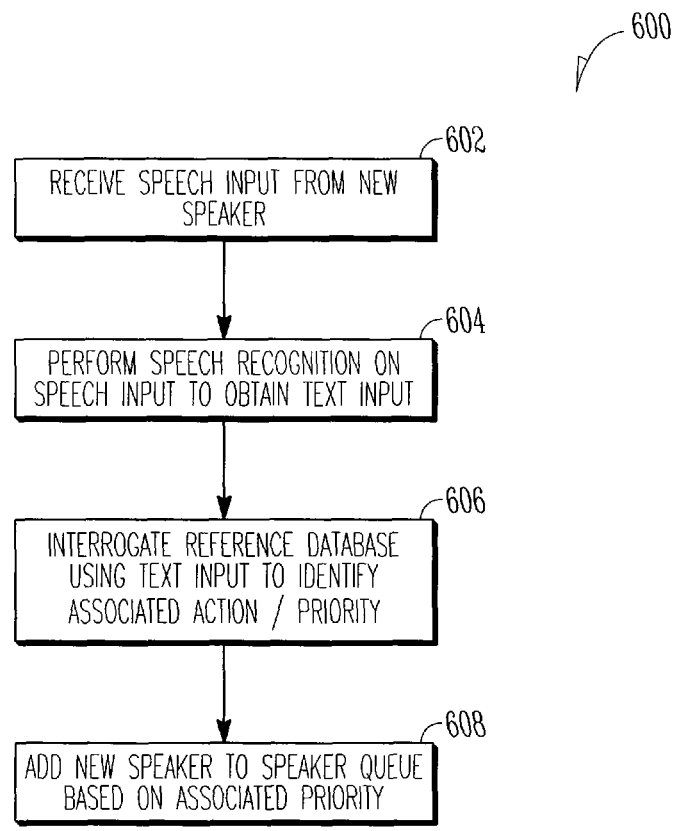
FIG. 6 shows a method, in accordance with an example embodiment, of adding a new speaker to a conference call using speech recognition.

Referring to FIG. 6, reference 600 generally indicates a method, in accordance with an example embodiment, to provide speaker selection in a multi-party conference call based on speech recognition. As shown at block 602, the method 600 may receive a speech input from a new speaker via a telephony endpoint 108.1-108.n . Thereafter, as shown at block 604, the method 600 performs speech recognition on the speech input to obtain a text input. The text input may be a text equivalent of the speech or audio received from the particular conference location 106.1-106.n associated with the new speaker. Thereafter, the text input may be used to interrogate a reference database (e.g., including a plurality of words) to identify an associated action, priority, or the like to be performed by the conference call manager (e.g., the conference call manager 200). For example, the conference call manager 200 may utilize its speech recognition module 210 to identify the text input from an audio communication received from a telephony endpoint 106.1-106.n . The speech recognition module 210 may then interrogate the reference database 212 (or any other database) to obtain an associated priority, class of service, or action. The method 600, as shown at block 608, may then add the new speaker to the speaker queue 206 based on the associated action, priority, or the like identified in the reference database. In anther example embodiment, if the priority of the spoken word is high, the system may pre-empt an active speaker and add the speaker of the high priority words or phrase to the list of active speakers. It will also be appreciated that a speech recognition module may be provided at the telephony endpoints 108.1-108.n.

For example, the speech recognition module 210 may be an Adaptive Speech Recognition (ASR) module or utilize natural language recognition technology and the reference database 212 may include so-called "hot words". The specific hot words may identify a participant's name, a particular priority or importance to what the particular participant has to say, the related subject matter which the participant may be desirous of speaking on, or the like. For example, the word "fire" spoken by any speaker may immediately allow the speaker to break in to the active speaker group. However, other requests spoken may have a lower priority and, accordingly, be placed in the speaker queue 206 at an appropriate new speaker slot 208.1-208.m . In an example embodiment, the speech recognition module 210 may also handoff or communicate the speech received from the new speaker at a telephony endpoint 108.1-108.n to an Interactive Voice Response (IVR) system to provide additional functionality. For example, the IVR system may obtain confirmation from the speaker whether he or she actually wants to speak or even identify a topic on which he or she wants to speak. In an example embodiment, input may be received from a new speaker and processed in the audio domain instead of processing the input to provide text. In response to the processing in the audio domain, the new speaker may be selectively added to the speaker queue. Thus, it is to be appreciated that the example embodiments are not limited in any way to conversion of the meaning of spoken words to a text equivalent.

In an example embodiment, endpoints 108.1-108.n that are not in the mix or active speaker group may be connected to a multicast output stream, and a unicast connection may be created to allow a single endpoint to start speaking. This may allow for multicast output streams where any speaker can speak exclusively, thus enhancing audio conference scalability.

Figure 7:
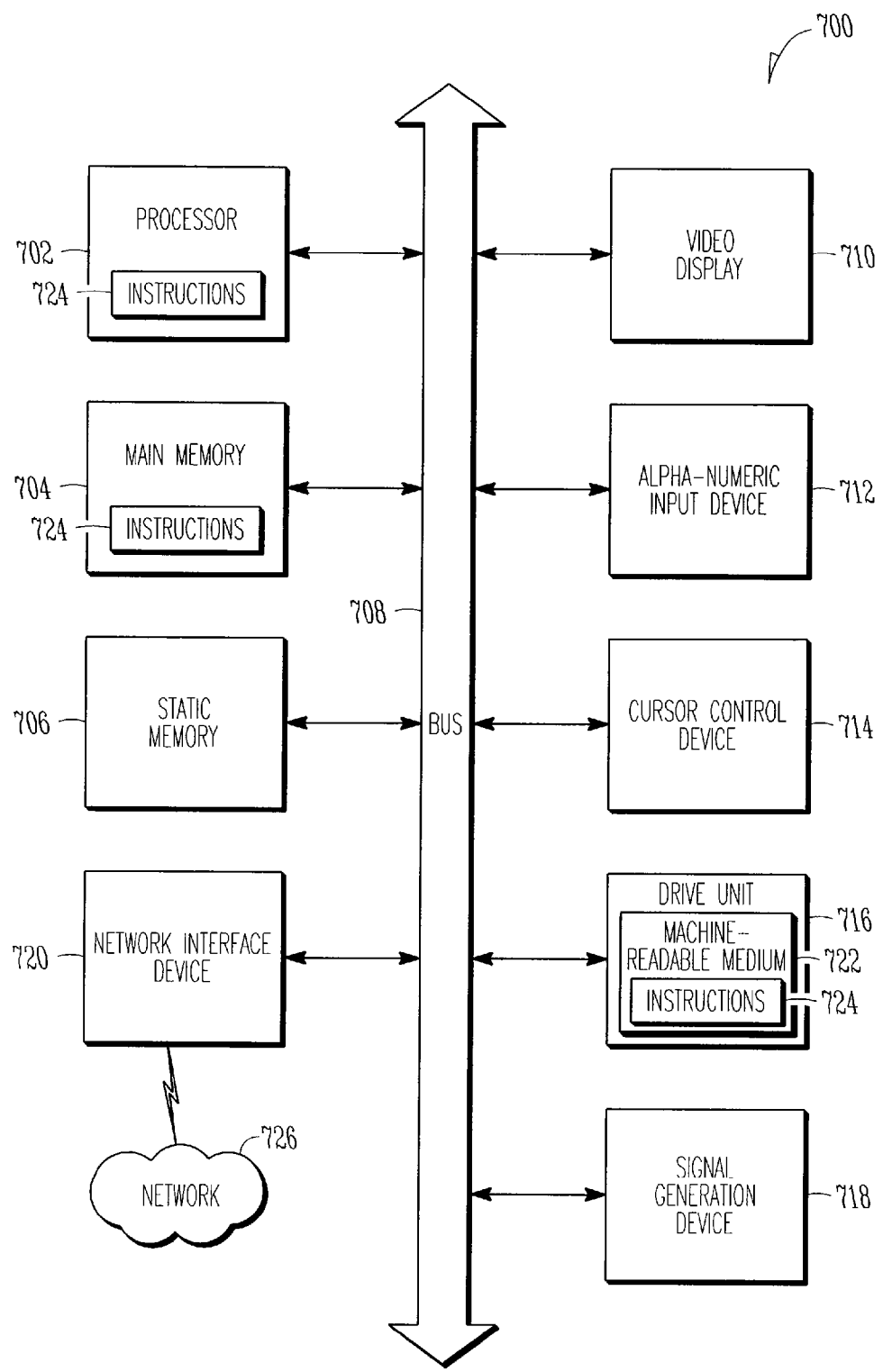
FIG. 7 shows a diagrammatic representation of machine in the example form of a computer system within which a set of instructions, for causing the machine to perform any one or more of the methodologies discussed herein, may be executed.

FIG. 7 shows a diagrammatic representation of machine in the example form of a computer system 700 within which a set of instructions, for causing the machine to perform any one or more of the methodologies discussed herein, may be executed. It will be appreciated that some of the components of the computer system 700 may be omitted in different embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. One or more components of the machine may be a personal computer (PC), a tablet PC, a set-top box (STB), a Personal Digital Assistant (PDA), a cellular telephone, a web appliance, a network router, switch or bridge, a port card, a line card, a service card or any machine capable of executing a set of instructions (sequential or otherwise) that specify actions to be taken by that machine. Further, while only a single machine is illustrated, the term "machine" shall also be taken to include any collection of distributed machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of providing speaker selection in a multi-party conference call including plural active speakers, the method comprising:
   receiving a speaker request from a first new speaker at a conference endpoint requesting participation in the multi-party conference call as an active speaker, wherein receiving the speaker request comprises:
      receiving a speech input from the first new speaker;
      performing speech recognition on the speech input to obtain a text input;
      processing the text input by interrogating a database using the text input,
   the database including a plurality of words and associated priorities; and
      adding the first new speaker to a speaker queue of participants requesting to be active speakers based on a priority associated with the text input;
   advising the first new speaker at what position within the speaker queue the first new speaker is inserted;
   monitoring when a number of active speakers is less than a predetermined maximum number of active speakers, wherein the predetermined maximum number is greater than one;
   automatically, without human intervention, adding to the active speakers a new speaker with highest priority from the speaker queue as a new active speaker when the number of active speakers is less than the predetermined maximum number of active speakers, and sending an indication to the new active speaker advising that the new active speaker is now among the active speakers;
   communicating via an independent communication channel to a plurality of conference call participants that a specific period of time has been allocated to the new active speaker and that the plurality of conference call participants should not attempt to talk during the specific period of time;
   monitoring whether the new active speaker speaks during a window period after the new active speaker has been added to the active speakers; and
   removing the new active speaker from among the active speaker in response to the first new speaker not speaking during the window period.

2. The method of claim 1, wherein receiving the speaker request includes receiving audio from a conference call endpoint via a voice communication channel of the multi-party conference call.

3. The method of claim 1, wherein the multi-party conference call is a video conference call.

4. Conference call apparatus to provide speaker selection in a multi-party conference call including plural active speakers, the apparatus comprising:
   an endpoint interface configured to interface the apparatus to a plurality of conference call endpoints; and
   an active speaker processing module configured to:
   receive a speaker request from a first new speaker at a conference endpoint requesting participation in the multi-party conference call as an active speaker, wherein the processing module is configured to:
      receive a speech input from the first new speaker;
      perform speech recognition on the speech input to obtain a text input;

process the text input by interrogating a database using the text input, the database including a plurality of words and associated priorities; and add the first new speaker to a speaker queue of participants requesting to be active speakers based on a priority associated with the text input;

advise the first new speaker at what position within the speaker queue the first new speaker is inserted;

monitor when a number of active speakers is less than a predetermined maximum number of active speakers, wherein the predetermined maximum number is greater than one;

automatically, without human intervention, add to the active speakers a new speaker with highest priority from the speaker queue as a new active speaker when the number of active speakers is less than the predetermined maximum number of active speakers, and send an indication to the new active speaker advising that the new active speaker is now among the active speakers;

communicate via an independent communication channel to a plurality of conference call participants that a specific period of time has been allocated to the new active speaker and that the plurality of conference call participants should not attempt to talk during the specific period of time;

monitor whether the new active speaker speaks during a window period after the new active speaker has been added to the active speakers; and remove the new active speaker from among the active speaker in response to the first new speaker not speaking during the window period.

5. The apparatus of claim 4, wherein the speaker request comprises audio from a conference call endpoint received via a voice communication channel of the multi-party conference call.

6. A non-transitory machine-readable storage medium including instructions which, when executed by the machine, cause the machine to perform operations comprising:

receiving a speaker request from a first new speaker at a conference endpoint requesting participation in the multi-party conference call as an active speaker, wherein receiving the speaker request comprises:

receiving a speech input from the first new speaker;

performing speech recognition on the speech input to obtain a text input;

processing the text input by interrogating a database using the text input, the database including a plurality of words and associated priorities; and adding the first new speaker to a speaker queue of participants requesting to be active speakers based on a priority associated with the text input;

advising the first new speaker at what position within the speaker queue the first new speaker is inserted;

monitoring when a number of active speakers is less than a predetermined maximum number of active speakers, wherein the predetermined maximum number is greater than one;

automatically, without human intervention, adding to the active speakers a new speaker with highest priority from the speaker queue as a new active speaker when the number of active speakers is less than the predetermined maximum number of active speakers, and sending an indication to the new active speaker advising that the new active speaker is now among the active speakers;

communicating via an independent communication channel to a plurality of conference call participants that a specific period of time has been allocated to the new active speaker and that the plurality of conference call participants should not attempt to talk during the specific period of time;

monitoring whether the new active speaker speaks during a window period after the new active speaker has been added to the active speakers; and removing the new active speaker from among the active speaker in response to the first new speaker not speaking during the window period.

7. A multi-party conference call apparatus, which comprises:

means for receiving a speaker request from a first new speaker at a conference endpoint requesting participation in the multi-party conference call as an active speaker, wherein the means for receiving the speaker request comprises:

means for receiving a speech input from the first new speaker;

means for performing speech recognition on the speech input to obtain a text input;

means for processing the text input by interrogating a database using the text input, the database including a plurality of words and associated priorities; and means for adding the first new speaker to a speaker queue of participants requesting to be active speakers based on a priority associated with the text input;

means for advising the first new speaker at what position within the speaker queue the first new speaker is inserted;

means for monitoring when a number of active speakers is less than a predetermined maximum number of active speakers, wherein the predetermined maximum number is greater than one;

means for automatically, without human intervention, adding to the active speakers a new speaker with highest priority from the speaker queue as a new active speaker when the number of active speakers is less than the predetermined maximum number of active speakers, and sending an indication to the new active speaker advising that the new active speaker is now among the active speakers;

means for communicating via an independent communication channel to a plurality of conference call participants that a specific period of time has been allocated to the new active speaker and that the plurality of conference call participants should not attempt to talk during the specific period of time;

means for monitoring whether the new active speaker speaks during a window period after the new active speaker has been added to the active speakers; and means for removing the new active speaker from among the active speaker in response to the first new speaker not speaking during the window period.

\* \* \* \* \*